United States Patent
Quinn et al.

(10) Patent No.: US 10,048,459 B2
(45) Date of Patent: Aug. 14, 2018

(54) OPTICAL BROADBAND NODE CABLE

(71) Applicant: AFL TELECOMMUNICATIONS LLC, Duncan, SC (US)

(72) Inventors: Justin Quinn, Boiling Springs, SC (US); Breti Villiger, Simpsonville, SC (US); Patrick Dobbins, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/308,270

(22) PCT Filed: May 4, 2015

(86) PCT No.: PCT/US2015/029058
§ 371 (c)(1),
(2) Date: Nov. 1, 2016

(87) PCT Pub. No.: WO2015/168686
PCT Pub. Date: Nov. 5, 2015

(65) Prior Publication Data
US 2017/0068062 A1    Mar. 9, 2017

Related U.S. Application Data

(60) Provisional application No. 61/987,687, filed on May 2, 2014.

(51) Int. Cl.
*G02B 6/44* (2006.01)
*H01B 11/22* (2006.01)
(Continued)

(52) U.S. Cl.
CPC ......... *G02B 6/4416* (2013.01); *G02B 6/4434* (2013.01); *G02B 6/4436* (2013.01);
(Continued)

(58) Field of Classification Search
None
See application file for complete search history.

(56) References Cited

U.S. PATENT DOCUMENTS 4,197,628 A * 4/1980 Conti .................. H02G 1/08
29/234
4,553,877 A   11/1985 Edvardsen
(Continued)

FOREIGN PATENT DOCUMENTS

JP    7-211159 A   *   8/1995

OTHER PUBLICATIONS

M. Hebbard, "A new fiber deployment technique for brownfield conversions". Broadband Properties, Aug./Sep. 2010, pp. 53-57. Retrieved from: http://www.bbcmag.com/2010mags/aug-sep10/BBP_Aug2010_BrownfieldConversions.pdf.*
(Continued)

*Primary Examiner* — Mike Stahl
(74) *Attorney, Agent, or Firm* — Dority & Manning, P.A.

(57) ABSTRACT

A reduced diameter composite microcable of low weight that is capable of withstanding a tensile load of at least 300 pounds with less than 0.6% fiber strain, is capable of operation between −40 C and 70 C with less than 0.1 dB/km attenuation change at 1550 nm, and whose outer diameter is less than 15 mm is provided. The microcable includes at least one buffer tube, at least one electrical power conductor, at least one rigid strength member cabled together into a multi-unit core, wherein a plurality of optical fibers are placed within the at least one buffer tube.

25 Claims, 6 Drawing Sheets

(51) Int. Cl.
*H01B 3/42* (2006.01)
*H01B 7/18* (2006.01)
*H01B 9/00* (2006.01)
H02G 1/08 (2006.01)
G02B 6/52 (2006.01)
H01B 7/282 (2006.01)
H01B 7/29 (2006.01)

(52) U.S. Cl.
CPC ......... *G02B 6/4464* (2013.01); *G02B 6/4494* (2013.01); *H01B 3/427* (2013.01); *H01B 7/183* (2013.01); *H01B 9/005* (2013.01); *H01B 11/22* (2013.01); *G02B 6/443* (2013.01); *G02B 6/52* (2013.01); *H01B 7/2825* (2013.01); *H01B 7/292* (2013.01); *H02G 1/086* (2013.01)

(56) References Cited

U.S. PATENT DOCUMENTS

| | | | | |
|---|---|---|---|---|
| 6,067,394 | A | 5/2000 | Ruello et al. | |
| 2004/0117964 | A1* | 6/2004 | Pichler | H02G 1/08 29/426.5 |
| 2005/0201696 | A1 | 9/2005 | Fee | |
| 2006/0213681 | A1 | 9/2006 | Magner | |
| 2007/0110376 | A1* | 5/2007 | Buthe | G02B 6/4416 385/123 |
| 2010/0316340 | A1* | 12/2010 | Sales Casals | G02B 6/4416 385/101 |
| 2011/0069932 | A1 | 3/2011 | Overton et al. | |
| 2011/0280527 | A1* | 11/2011 | Tamura | G02B 6/4416 385/101 |
| 2012/0213483 | A1* | 8/2012 | Risch | G02B 6/44 385/113 |
| 2013/0051741 | A1* | 2/2013 | Register, III | G02B 6/4495 385/101 |
| 2014/0079359 | A1* | 3/2014 | Yu | G02B 6/44 385/101 |
| 2015/0219867 | A1* | 8/2015 | Ruan | G02B 6/4416 385/101 |

OTHER PUBLICATIONS

AFL Telecommunications, LLC; International Patent Application No. PCT/US2015/029058; International Search Report; dated Jul. 31, 2015; (1 page).

Control Cable, Catalog [Online]. Anixton 2013. [retrieved on Jul. 2, 2015]. Retrieved from the internet: <URL: https://www.anixter.com/content/dam/Anixter/Catalogs/2010%20Wire%20and%20Cable%20Catalog/10C0003X0-Anixter-Wire&Cable-Catalog-2010-Sec08-Control-Cable-EN-US.pdf>. Entire document.

* cited by examiner

| Requirement | Test |
|---|---|
| R6-11 | Ripcord Access at Install Temperature |
| R6-39 | Low and High Temperature Cable Bend |
| R6-40 | Impact Resistance |
| R6-41 | Compressive Strength |
| R6-43 & 6-44 | Tensile Strength of Cable |
| R6-45 | Cable Twist |
| R6-46 | Cable Cyclic Flexing |
| R6-50 | Buffer Tube Kink Test |
| R6-53 | Temperature Cycling |
| R6-55 | Cable Aging |
| R6-56 | Cable Freezing |
| R6-60 | Water Penetration |

Figure 3

| | Cable Strain | | | | Fiber Strain | | |
|---|---|---|---|---|---|---|---|
| | Original Predicted | Predicted (Including Copper) | Actual | Requirement | Original Predicted | Predicted (Including Copper) | Actual |
| 300lbs Install | 2.38% | 0.26% | 0.62% | <0.6% | 2.22% | 0.10% | 0.22% |
| 90lbs Residual | 0.79% | 0.08% | 0.40% | <0.2% | 0.63% | 0.00% | 0.03% |
| Final (Base Load) | 0.00% | 0.00% | 0.24% | - | 0.09% | 0.00% | 0.00% |

Figure 4

|        | Sample 1 | Sample 2 |
|--------|----------|----------|
| Tube 1 | 45mm     | 44mm     |
| Tube 2 | 49mm     | 40mm     |

Figure 6

OPTICAL BROADBAND NODE CABLE

CROSS-REFERENCE TO RELATED APPLICATIONS

This application is based upon and claims the benefit of priority from U.S. Provisional Patent Application No. 61/987,687 filed May 2, 2014 in the United States Patent and Trademark Office, and as a U.S. national stage filing of International Application No. PCT/US2015/029058 having an international filing date of May 4, 2015, the disclosures of both of which are incorporated by reference herein in their entireties.

BACKGROUND

1. Field

The invention is related to an optical broadband node cable containing optical fibers and electrical conductors, and more particularly to a small diameter, low mass composite cable designed specifically to be blown into a pathway established by the extraction of the core of a coax cable.

2. Related Art

As the demand for bandwidth needed to support communications devices in the home continues to increase, fiber networks continue to grow and replace existing copper cable networks. In addition to transmitting communication signals, existing networks often require electrical power to operate. Removing existing cables and replacing with new, fiber optic and electrical cables can be time consuming and expensive.

MicroCore blown cables provide a new blown cable technology that is optimized for installation in the extracted core of traditional coax feeder cable and can also be used for powering of the remote broadband node equipment.

There is a need for a small diameter, low mass composite cable designed specifically to be blown into a pathway established by the extraction of the core of a coax cable, to be used for powering the broadband service node and to provide the optical fibers that carry the broadband services of voice, data and video signals.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an aspect of an exemplary embodiment, a reduced diameter composite microcable of low weight that is capable of withstanding a tensile load of at least 300 pounds with less than 0.6% fiber strain, is capable of operation between −40 C and 70 C with less than 0.1 dB/km attenuation change at 1550 run, and whose outer diameter is less than 15 mm includes at least one buffer tube, at least one electrical power conductor, and at least one rigid strength member cabled together into a multi-unit core, wherein a plurality of optical fibers are placed within the at least one buffer tube.

According to another exemplary embodiment, the at least one electrical power conductor is Thermoplastic Heat and Water-resistant Nylon-coated (THWN) or Thermoplastic High Heat-resistant Nylon-coated (THHN).

According to another exemplary embodiment, the at least one electrical power conductor is of 12-14 American Wire Gauge (AWG).

According to another exemplary embodiment, the at least one electrical power conductor consists of multiple copper strands.

According to another exemplary embodiment, the at least one electrical power conductor is Thermoplastic Flexible Fixture Wire Nylon (TFFN).

According to another exemplary embodiment, the at least one electrical power conductor is of 16-18 American Wire Gauge (AWG).

According to another exemplary embodiment, the at least one electrical power conductor consists of multiple copper strands.

According to an aspect of an exemplary embodiment, the at least one buffer tube is constructed of a thermoplastic polymer.

According to another exemplary embodiment, the at least one buffer tube is filled with gel.

According to another exemplary embodiment, the at least one buffer tube is free of gel.

According to another exemplary embodiment, the at least one buffer tube contains up to twenty four optical fibers.

According to another exemplary embodiment, the cable sheath is a thermoplastic polymer.

According to another exemplary embodiment, the microcable further includes an outer jacket containing undulations to assist with jetting into a microduct.

According to another exemplary embodiment, the outer jacket contains striations to assist with jetting into the microduct.

According to another exemplary embodiment, the multi-unit core contains two gel-filled buffer tubes, each comprised of 24 optical fibers, and two 14 American Wire Gauge (AWG) Thermoplastic Heat and Water-resistant Nylon-coated (THWN) power conductors that are helically cabled over a 12 mm rigid strength member, with an outer High-density Polyethylene (HDPE) sheath of 0.5 mm nominal wall thickness.

According to another exemplary embodiment, the nominal cable outer diameter (OD) is 7.9 mm.

According to another exemplary embodiment, the nominal cable weight is 82 kg/km.

According to another exemplary embodiment, the multi-unit core contains three gel-filled buffer tubes, each comprised of 24 optical fibers, and two 0.16 American Wire Gauge (AWG) Thermoplastic Flexible Fixture Wire Nylon (TFFN) power conductors that are SZ cabled over a 2 mm rigid strength member, with an outer High-density Polyethylene (HDPE) sheath of 0.5 mm nominal wall thickness.

According to another exemplary embodiment, the nominal cable outer diameter (OD) is 8.0 mm.

According to another exemplary embodiment, the nominal cable weight is 70 kg/km.

According to another exemplary embodiment, the multi-unit core contains four gel-filled buffer tubes, each comprised of 24 optical fibers, two 16 American Wire Gauge (AWG) Thermoplastic Flexible Fixture Wire Nylon (TFFN) power conductors, and two 2.3 mm outer diameter (OD) fillers that are SZ cabled over a 4.3 mm rigid strength member, with an outer High-density Polyethylene (HDPE) sheath of 0.5 mm nominal wall thickness.

According to another exemplary embodiment, the nominal cable outer diameter (OD) is 10.3 mm.

According to another exemplary embodiment, the nominal cable weight is 95 kg/km.

According to another exemplary embodiment, the multi-unit core contains six gel-filled buffer tubes, each comprised of 24 optical fibers, and three 16 American Wire Gauge (AWG) Thermoplastic Flexible Fixture Wire Nylon (TFFN) power conductors that are SZ cabled over a 5.2 mm rigid strength member, with an outer High-density Polyethylene (HDPE) sheath of 0.5 mm nominal wall thickness.

According to another exemplary embodiment, the nominal cable outer diameter (OD) is 11.2 mm.

According to another exemplary embodiment, the nominal cable weight is 133 kg/km.

According to another exemplary embodiment, a pathway is established by removing an insulation core and coax center from a traditional broadband coax cable and the multi-unit core is jetted into the pathway.

According to another exemplary embodiment, the composite microcable is utilized for Broadband Node Split, supplying more bandwidth to the end consumer.

According to another exemplary embodiment, the composite microcable is utilized for broadband Radio Frequency Over Glass (RFOG)/Gigabit Passive Optical Network (GPON) distributive access, supplying more bandwidth to the end consumer.

According to another exemplary embodiment, a pathway is a microduct contained within a traditional dielectric duct and the multi-unit core is jetted into the pathway.

According to an aspect of another exemplary embodiment, a method of manufacturing a reduced diameter composite microcable of low weight that is capable of withstanding a tensile load of at least 300 pounds with less than 0.6% fiber strain, is capable of operation between −40 C and 70 C with less than 0.1 dB/km attenuation change at 1550 nm, and whose outer diameter is less than 15 mm includes removing an insulation core and coax center from a traditional broadband coax cable and pushing and floating a multiunit core comprising at least one buffer tube, at least one electrical power conductor and at least one rigid strength member through residual elements of the coax cable.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
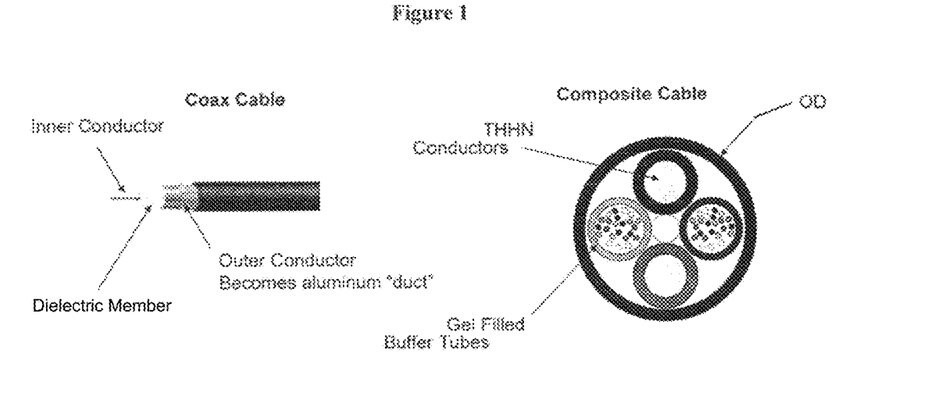
FIG. 1 illustrates a comparison between a standard co-ax cable and a composite optical broadband node cable, according to an exemplary embodiment.

Referring to the drawings, FIG. 1, an optical broadband node cable contains optical fibers and electrical conductors. Such a cable comprises a small diameter and low mass, designed specifically to be blown into a pathway established by the extraction of the core of a coax cable core. This special cable of small diameter may be used for powering the broadband service node and to provide the optical fibers that carry the broadband services of voice, data and video signals. The cable may be optimized to be installed in a small diameter pathway by a special installation device that pushes and floats the composite micro cable through the residual elements (outer jacket and armor) after the insulation core and coax center is removed via the special cable core extraction process.

The design may consist of gel filled polybutylene terephthalate (PBT) buffer tubes, cabled with Thermoplastic Heat and Water-resistant Nylon-coated (THWN) conductors with a constant pitch to allow operation at temperatures as low as −40 C and as high as 75 C and withstand installation loads of up to 600 lbs. without damaging any of the cable elements, according to an exemplary embodiment. A high density polyethylene outer jacket may be used to provide significant protection to the core components and allow the cable to be blown into the duct.

According to an exemplary embodiment, the composite cable may consist of two 2.7 mm, gel filled buffer tubes −1.95 mm ID for 12 fibers and 2.1 mm ID for 24 fibers—and two 14 American Wire Gauge (AWG) Thermoplastic High Heat-resistant Nylon-coated (THHN)THWN conductors that are helically cabled over a center strength member (CSM) with a 120 mm right hand lay, as depicted in FIG. 1. Two 1500 denier water-swell yarns are pulled in with the CSM to prevent water migration down the center of the core, and an aramid strength member is helically wrapped around the core with a 30 mm left hand lay to bind the units together. Two 1500 denier water-swell ripcords are pulled in under the outer High Density Polyethylene (HDPE) jacket to prevent water migration between tike core and jacket. The nominal cable OD may be 7.8 mm to allow jetting into the ~11.4 mm ID aluminum duct remaining after the coax core is removed, according to an exemplary embodiment.

One of the applications of the optical broadband node cable is that the inner conductor and dielectric member of installed coax cables will be removed, leaving a buried "duct," following which the composite cable is jetted into the duct, in-turn supplying power to nodes (90 VAC) via copper conductors and supplying additional bandwidth to the home through fiber.

Figure 2:
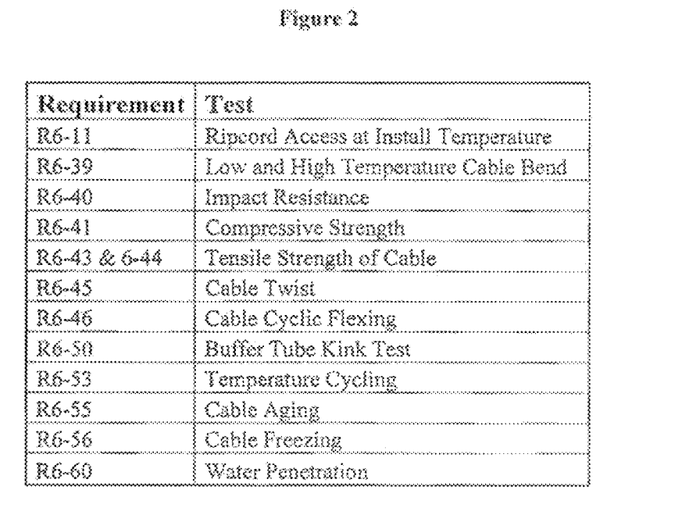
FIG. 2 is a table reciting a list of tests performed per the Micro-duct cable requirements of Telcordia GR-20, Issue 4.

FIG. 2 is a table reciting a list of tests performed per the Micro-duct cable requirements of Telcordia GR-20, Issue 4.

Referring to FIG. 2, test plan, per the Micro-duct cable requirements of GR-20, Issue 4, is listed in FIG. 2. Note that the Micro-duct cable requirements reference IEC 60794-5-10, family specification "outdoor microduct optical fiber cables, microducts and protected microducts for installation by blowing." In each case, the requirements of GR-20 are equally or more stringent than those listed in IEC 60794-5-10.

On performing the bending test at low and high temp on the test cable, the test cable passed. The test cable was conditioned at −30 C and +70 C, and wrapped around a mandrel 20 times the cable's outside diameter (OD). No measurable attenuation increase was observed, and the conductors maintained electrical continuity after the testing.

On performing the impact resistance test, the test cable passed. The test cable was subjected to two 4.4 Nm impacts at three locations. No measurable attenuation increase was observed, and the conductors maintained electrical continuity after the testing.

On performing the compressive strength test, the test cable passed. The test cable was subjected to an initial load of 220 N/cm that was subsequently reduced to 110 N/cm. No measurable attenuation increase was observed prior to the release of the 110 N/cm load, and the conductors maintained electrical continuity after the testing.

On performing the cable twist test, the test cable passed. A 1 meter length of the test cable was subjected to 10 twist cycles with no measurable attenuation increase. The conductors maintained electrical continuity after the testing.

On performing the cable cyclic flexing test, the test cable passed. The test cable was flexed for 25 cycles over a mandrel 20 times the cables OD. No measurable attenuation increase was observed during or after the test, and the conductors maintained electrical continuity after the testing.

Figure 3:
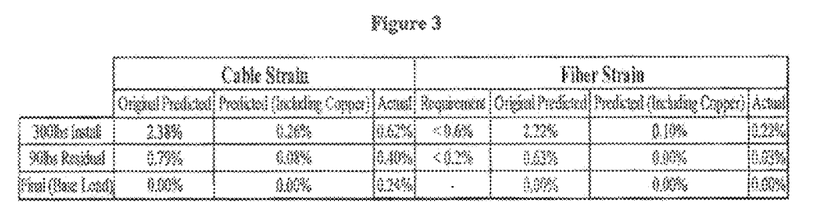
FIG. 3 is a table providing data on the cable strain and fiber strain, according to another exemplary embodiment.

FIG. 3 is a table providing data on the cable strain and fiber strain, according to another exemplary embodiment.

Referring to FIG. 3, on performing the tensile strength and fiber strain test, the test cable passed. The tensile load was incrementally increased to 300 lbs and then incrementally reduced to 90 lbs. Strain levels were much lower than originally predicted due to the contribution of the copper conductors, but more than predicted when assuming 100% contribution of copper conductors. Additionally, the strain free window was higher than predicted. Attenuation increases were less than 0.01 db at the residual load and the conductors maintained continuity after the testing. The results of the test are depicted in FIG. 3

Figure 4:
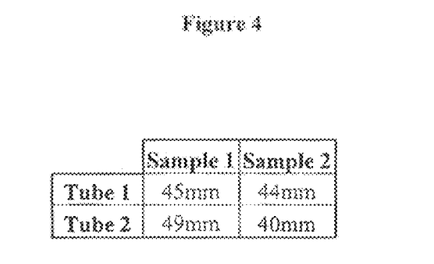
FIG. 4 is a table depicting the results of a buffer tube kink test performed on the composite optical broadband node cable, according to another exemplary embodiment.

FIG. 4 is a table depicting the results of a buffer tube kink test performed on the composite optical broadband node cable, according to another exemplary embodiment.

Referring to FIG. 4, on performing the buffer tube kink test, the test cable passed. Samples of both tubes were tested until failure (kink occurs) and the diameter was recorded. GR-20 does not specify the kink diameter, rather it states that the measured value must be less than or equal to the value stated by the cable manufacturer. The results of the test for both tubes in two samples are depicted in FIG. 4

Figure 5:
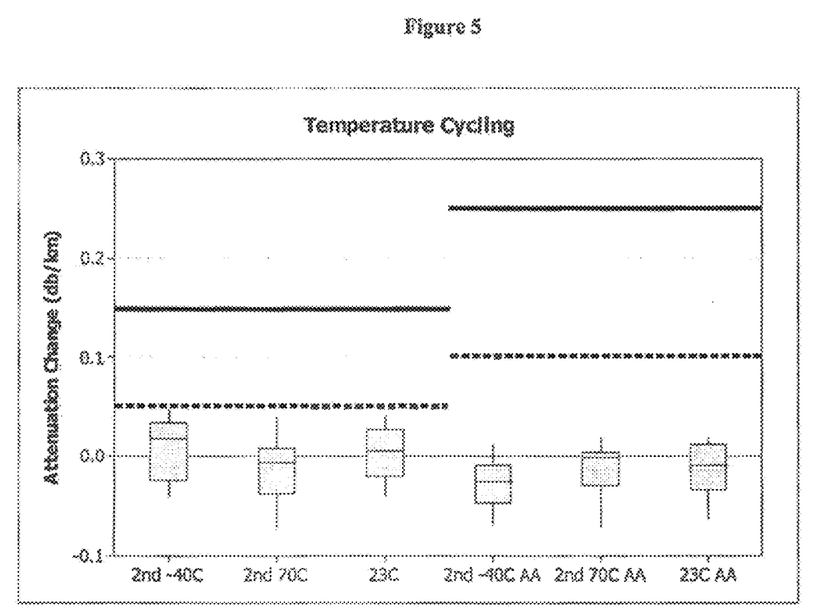
FIG. 5 illustrates results of temperature cycling and cable aging on an exemplary embodiment of the composite broadband node cable.

FIG. 5 illustrates results of temperature cycling on an exemplary embodiment of the composite broadband node cable.

Referring to FIG. 5, cycling through different temperature ranges, we see that the test cable shows minimal attenuation change, thereby passing the temperature cycling and cable aging test.

Figure 6:
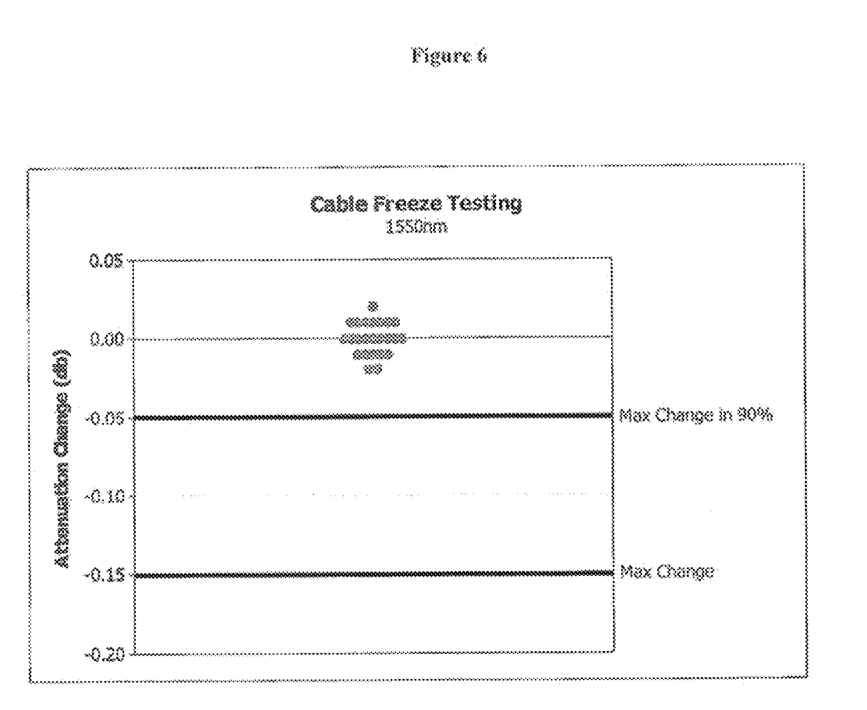
FIG. 6 illustrates results of freezing an exemplary embodiment of the composite broadband node cable.

FIG. 6 illustrates results of freezing an exemplary embodiment of the composite broadband node cable.

Referring to FIG. 6, on performing the cable freezing test, the test cable passed. The test cable was conditioned per the requirements after loosely coiling in a tank and immersing in water. The conductors maintained electrical continuity after the testing.

On performing the water penetration test, the test cable passed. The test was conducted with the conductors capped. The conductors are not water tight, so water will flow through the conductors. However, the cable can be designed to be water tight per the requirements.

Based on the test results conducted and depicted in FIGS. 2-6, it is clear the Composite MicroCore design is compliant with the requirements of GR-20.

Advantages and benefits of the composite optical broadband node cable, as described with reference to FIG. 1 and tested with reference to FIGS. 2-6 above, is optimized to utilize a new pathway established by the removal of the dielectric member and inner conductor of a traditional coax backbone cable. The design will reduce cable installation cost and time, while increasing bandwidth to the home by remotely providing the electrical power needed to support the network equipment and the optical fibers for the transmission of consumer services such as voice, data and video.

Although benefits of composite optical broadband node cable are listed above, the benefits are not limited thereto.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

The invention claimed is:

1. A reduced diameter composite microcable of low weight that is capable of withstanding a tensile load of at least 300 pounds with less than 0.6% fiber strain, is capable of operation between −40 C and 70 C with less than 0.1 dB/km attenuation change at 1550 nm, and whose outer diameter is less than 15 mm, the microcable comprising:
    at least one buffer tube;
    at least one electrical power conductor;
    at least one rigid strength member cabled together into a multi-unit core; and
    an outer jacket surrounding the multi-unit core, wherein the at least one buffer tube and the at least one electrical power conductor are directly adjacent the outer jacket with no intervening components therebetween, wherein a plurality of optical fibers are placed within the at least one buffer tube.

2. The microcable of claim 1, wherein the at least one electrical power conductor is Thermoplastic Heat and Water-resistant Nylon-coated (THWN) or Thermoplastic High Heat-resistant Nylon-coated (THHN).

3. The microcable of claim 2, wherein the at least one electrical power conductor is of 12-14 American Wire Gauge (AWG).

4. The microcable of claim 3, wherein the at least one electrical power conductor consists of multiple copper strands.

5. The microcable of claim 1, wherein the at least one electrical power conductor is Thermoplastic Flexible Fixture Wire Nylon (TFFN) coated.

6. The microcable of claim 5, wherein the at least one electrical power conductor is of 16-18 American Wire Gauge (AWG).

7. The microcable of claim 6, wherein the at least one electrical power conductor consists of multiple copper strands.

8. The microcable of claim 1, wherein the at least one buffer tube is constructed of a thermoplastic polymer.

9. The microcable of claim 8, wherein the at least one buffer tube is filled with gel.

10. The microcable of claim 8, wherein the at least one buffer tube is free of gel.

11. The microcable of claim 8, wherein the at least one buffer tube contains up to twenty four optical fibers.

12. The microcable of claim 1, wherein the outer jacket contains undulations to assist with jetting into a microduct.

13. The microcable of claim 1, wherein the outer jacket contains striations to assist with jetting into a microduct.

14. The microcable of claim 1, wherein the multi-unit core contains two gel-filled buffer tubes, each comprised of 24 optical fibers, and two 14 American Wire Gauge (AWG) Thermoplastic Heat and Water-resistant Nylon-coated (THWN) power conductors that are helically cabled over a 1.2 mm diameter rigid strength member, with an outer High-density Polyethylene (HDPE) sheath of 0.5 mm nominal wall thickness.

15. The microcable of claim 14, wherein the nominal cable outer diameter (OD) is 7.9 mm.

16. The microcable of claim 14, wherein the nominal cable weight is 82 kg/km.

17. The microcable of claim 1, wherein the multi-unit core contains three gel-filled buffer tubes, each comprised of 24 optical fibers, and two 16 American Wire Gauge (AWG) Thermoplastic Flexible Fixture Wire Nylon (TFFN) coated power conductors that are SZ cabled over a 2 mm diameter rigid strength member, with an outer High-density Polyethylene (HDPE) sheath of 0.5 mm nominal wall thickness.

18. The microcable of claim 17, wherein the nominal cable outer diameter (OD) is 8.0 mm.

19. The microcable of claim 17, wherein the nominal cable weight is 70 kg/km.

20. The microcable of claim 1, wherein the multi-unit core contains four gel-filled buffer tubes, each comprised of 24 optical fibers, two 16 American Wire Gauge (AWG) Thermoplastic Flexible Fixture Wire Nylon (TFFN) coated power conductors, and two 2.3 mm outer diameter (OD) fillers that are SZ cabled over a 4.3 mm diameter rigid strength member, with an outer High-density Polyethylene (HDPE) sheath of 0.5 mm nominal wall thickness.

21. The microcable of claim 20, wherein the nominal cable outer diameter (OD) is 10.3 mm.

22. The microcable of claim 20, wherein the nominal cable weight is 95 kg/km.

23. The microcable of claim 1, wherein the multi-unit core contains six gel-filled buffer tubes, each comprised of 24 optical fibers, and three 16 American Wire Gauge (AWG) Thermoplastic Flexible Fixture Wire Nylon (TFFN) coated power conductors that are SZ cabled over a 5.2 mm diameter rigid strength member, with an outer High-density Polyethylene (HDPE) sheath of 0.5 mm nominal wall thickness.

24. The microcable of claim 23, wherein the nominal cable outer diameter (OD) is 11.2 mm.

25. The microcable of claim 23, wherein the nominal cable weight is 133 kg/km.

* * * * *

UNITED STATES PATENT AND TRADEMARK OFFICE
CERTIFICATE OF CORRECTION

PATENT NO. : 10,048,459 B2
APPLICATION NO. : 15/308270
DATED : August 14, 2018
INVENTOR(S) : Justin Quinn et al.

Page 1 of 1

It is certified that error appears in the above-identified patent and that said Letters Patent is hereby corrected as shown below:

On the Title Page

Item (72) Inventors section: Brett Villiger's first name is listed as "Breti" and it should be spelled "Brett".

Signed and Sealed this
Nineteenth Day of March, 2019

Andrei Iancu
*Director of the United States Patent and Trademark Office*